United States Patent [19]

Becker

[11] Patent Number: 4,982,613
[45] Date of Patent: Jan. 8, 1991

[54] FORCE SENSOR
[75] Inventor: Manfred A. Becker, Frankenthal, Fed. Rep. of Germany
[73] Assignee: Deere & Company, Moline, Ill.
[21] Appl. No.: 441,856
[22] Filed: Nov. 27, 1989

[30] Foreign Application Priority Data

Dec. 24, 1988 [EP] European Pat. Off. ............ 3843869

[51] Int. Cl.⁵ .......................... G01L 1/26; G01L 5/13
[52] U.S. Cl. .............................. 73/862.64; 73/862.57; 73/DIG. 3; 172/7
[58] Field of Search ........... 73/862.54, 862.57, 862.62, 73/862.64, DIG. 3; 172/7

[56] References Cited

U.S. PATENT DOCUMENTS 3,888,315 6/1975 Elfes et al. .
4,271,910 6/1981 Schafer .
4,315,548 2/1982 Nakamura et al. .
4,456,074 6/1984 Prudenziati .
4,497,375 2/1985 Mucheyer et al. .

FOREIGN PATENT DOCUMENTS 3110107 9/1982 Fed. Rep. of Germany .
3138985 4/1983 Fed. Rep. of Germany .
3434131 3/1986 Fed. Rep. of Germany .
3515126 10/1986 Fed. Rep. of Germany .
8528468 3/1987 Fed. Rep. of Germany .
3722041 1/1989 Fed. Rep. of Germany .
2133557 7/1984 United Kingdom .

Primary Examiner—Charles A. Ruehl

[57] ABSTRACT

A force sensor has a hollow flexible body with a fixed end and a free end. The force to be measured is applied perpendicular to the axis of the flexible body by a link coupled to the free end. A rigid gauge rod is connected to the free end of the flexible body and extends through the interior of the flexible body. The rod carries on its free end a permanent magnet which is near a Hall-effect sensor which is fixed to the fixed end of the body. The flexible body has a relatively low bending stiffness at its free end (in the area of force application) and an increasing bending stiffness towards its fixed end. The flexible body has a relatively low bending stiffness in the direction of force application and a higher bending stiffness in a perpendicular direction. The permanent magnet is arranged so that its poles are aligned parallel to the direction of force application.

9 Claims, 5 Drawing Sheets

FORCE SENSOR

BACKGROUND

This invention relates to a sensor for sensing tensile and compressive forces such as are applied to the hitch linkages of a tractor hitch.

A known draft force sensor is described in German Patent publication No. DE 3,515,126 published on Oct. 30, 1986. This sensor includes a hollow bendable tube with a fixed end and a free end. Mounted inside the tube is a rigid gauge rod which has a fixed end fixed to the free end of the tube. The gauge rod extends to a free end near the fixed end of the tube. A magnetic deflection sensor senses deflection of the rod free end. The hollow bendable tube has a substantially uniform outer diameter. With the application of a force the flexible body or tube deflects by an amount which depends upon the force applied. The force is applied to the free end of the tube near where the gauge rod is connected to the flexible tube so that the free end of the gauge rod will deflect to a new position.

With a bendable tube which has a substantially constant outer diameter along its length, the deflection will increase steadily over the entire length and the axis of the flexible body in the region of force application is deflected through a certain angle from its position of rest. This angle is transmitted to the gauge rod which is not subject to any bending forces. In addition, the gauge rod is given a translational movement in the force direction perpendicular to the axis of the flexible body by reason of the deflection of the flexible body. The change in position resulting from the angle of deflection and the translational movement are transmitted to the free end of the gauge rod, which assumes a new position as a result. It has been shown, however, that these two effects upon the position at the free end of the gauge rod have opposite results, so that a movement of the free end by reason of the inclination is partly offset by the translational movement, which reduces the sensitivity of the force sensor. This compensating effect is particularly strong in short flexible bodies.

The flexible tube must be so designed that it can absorb the maximum applied load elastically without deforming permanently under load. In addition, the high bending moment at the fixed end connection and the bearing pressure under the applied force must be considered in the design.

In a number of applications, static loads as well as dynamic loads must be considered. For example, in an agricultural tractor hitch control system, the drawbar pull between the tractor and soil working implement must be measured by force sensors, and the control system moves the hitch as a function of the measured force. The load on a force sensor may be subject to sharp variations due to uneven ground, rocks, etc., which may lead to shock and vibration.

In order to be able to transmit large forces, it is an advantage to design the flexible body as short as possible. In addition, a lengthening of the gauge rod, which could lead to a greater measurement signal, is possible only to a limited extent, since its bending due to its own weight coupled with a reduced frequency will impair the reproducibility of the measurements. Such a lengthened rod could be excited to resonant vibration by the least shock, thereby inducing deflections that could far exceed the deflections for the expected measurement.

The requirement for short flexible bodies and gauge rods leads to the result that the deflections at the free end of the gauge rod from its position of rest, and hence the measurement signal, are relatively insensitive to the applied force.

SUMMARY

An object of this invention is to provide a force sensor for the measurement of tensile and compressive loads with improved sensitivity that can be utilized in a rough environment such as an agricultural tractor hitch control system.

This and other objects are achieved by the present invention wherein a hollow flexible body has a bending stiffness which is low in the region of force application and which increases towards its fixed end. A gauge rod is received by a bore in the flexible body and is clamped to the free end of the flexible body. The gauge rod extends into the interior of the flexible body to a free end. The bore in the flexible body must be large enough to exclude any contact of the gauge rod with the walls of the bore.

The flexible body has a cross section which increases from its free end to its fixed end. The central region of the flexible body may be generally conical. This shape may be manufactured at low cost and provides a favorable rate of change in bending stiffness along the axis of the flexible body.

Preferably, the center region of the flexible body has different cross-sectional thicknesses in two preferred directions. The flexible body has a generally rectangular cross section with a thinner dimension in the direction of force application and a wider dimension in a direction perpendicular to the direction of force application. This assures that forces applied to the flexible body which should not affect the measurement signal are suppressed (filtered out) by the shape of the flexible body. This is of particular advantage in draft sensing for agricultural tractors, since only the substantially horizontal drawbar pull forces are to be considered in the control, and not the vertical forces that result from implement weight or similar factors. Thus, the cross section central region of the flexible body is rectangular in the vertical plane and conical in the horizontal plane. Preferably, all transitions between differing cross sectional shapes are rounded to reduce stresses.

The mounting end of the flexible body preferably carries a flange perpendicular to the axis of the flexible body for attachment to the vehicle chassis. In the preferred arrangement, the flexible body carries a shank which extends from the flange and away from the free end of the flexible body and which is received in a mounting bore in the tractor housing. Due to this extension of the shank, the length of the gauge rod may be increased, so that its free end can experience a greater deflection for the same applied force. There are, however, limits to the extension in length in view of the natural frequency problems noted initially.

Preferably, the flexible body is cylindrical in shape in the area of the force application. This cylindrical surface engages a bearing part which can rotate about the axis of the flexible body and whose outer surface is spherical. The bearing part is pivotally received by an opening in a link to which draft forces are applied. This has the advantage that the link is always radial to the central axis of the force sensor and that it can adjust itself to the direction of the applied force.

Preferably, the sensor actuator is a magnet whose poles are aligned perpendicular to the axis of the gauge rod. The sensor is a Hall effect transducer, which is arranged so that it detects the components of the magnetic field which are parallel to the axis of the gauge rod. If, in a rest position of the force sensor, the Hall effect transducer is located in a central position between the poles of the magnet, then the polarity of the output signal from the Hall effect transducer will directly indicate the direction of the force application.

The magnet is preferably a rectangular slab-shaped permanent magnet whose length in the direction of polarization is greater than its thickness in the direction of the axis of the gauge rod. Such a magnet generates magnetic field lines running from pole to pole with approximately constant field strength perpendicular to the direction of polarization of the magnet within broad limits. Thus, movement of the gauge rod perpendicular to the North-South direction of the magnet does not result in a significant change in the field strength at the location of the Hall effect transducer. Hence, such an arrangement delivers a measurement signal only when the force is applied to the force sensor in a direction parallel to a line connecting the magnet poles. This selectivity towards the force signal is particularly advantageous, as has previously been noted, in force sensors which are intended for attachment to couplings for soil working implements of agricultural tractors.

It is advantageous to utilize the relative effectiveness of the flexible body with differing bending stiffness in two different radial planes and the relative effect of the described arrangement of magnet and Hall effect transducer operating in the same sense, so that both effect amplify one another and improve the selectivity.

DETAILED DESCRIPTION

Figure 1:
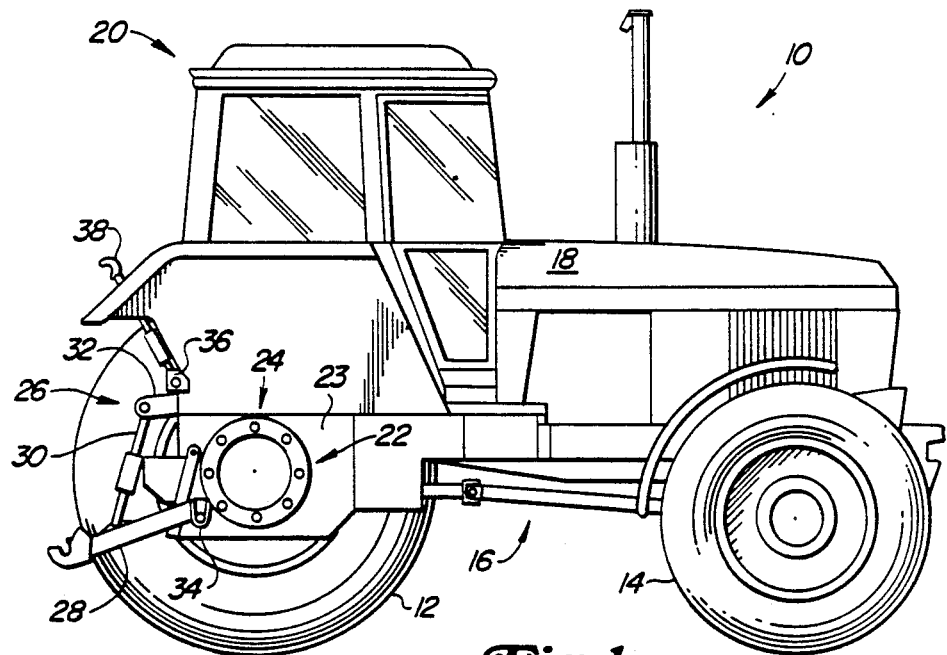
FIG. 1 shows a prime mover with which the present invention may be used.

A prime mover 10 shown in FIG. 1, in the form of an agricultural tractor, includes a chassis 16 supported on rear and front wheels 12, 14, an engine section 18 and a cab 20. Behind the engine section 18 and below the cab 20 a housing 22 is attached containing a gear set (not shown) and supporting axle housings 24, in which the rear wheels 12 are mounted on bearings. The housing 22, which is surrounded by housing walls 23, is attached to an equipment hitch 26 for three-point attachment.

The hitch includes lower draft links 28, associated lift struts 30 and lift arms 32, which are attached to a lift shaft (not shown). Each link 28 is attached to a force sensor 34, according to the invention, which is mounted in or on the housing 22 in its rear, lower area, with the axis of the sensor 34 extending horizontally and perpendicular to the direction of vehicle travel. The hitch 26 is arranged symmetrically about the longitudinal center plane of the prime mover 10. Accordingly, the description covers only the side located to the right of the center plane in the direction of travel.

In the upper rear section of the housing 22, a mount 36 is provide for an upper draft link, which can be coupled to an attached implement (not shown). It should be noted that a force sensor could be applied in connection with the upper link 38, in order to measure the forces occurring in the upper link 38 and to use these for control or regulation.

The force sensor 34 is loaded at its free end by tensile forces which result from the working resistance of the attached or coupled implement (not shown), and which are transmitted to the free end of the sensor 34 by the link 28. At the same time the upper link 38 serves as a balancing point in order to avoid undesirable pitching movements by the implement.

These tensile loads bend each force sensor 34 to a greater or lesser degree, in proportion to the force transmitted by the link 28. The force sensors 34 are connected to a control circuit (not shown) which includes a valve by means of which a hydraulic cylinder (not shown) is supplied with pressurized fluid in order to produce the up or down movement of the links 28 about the axis 40 of the force sensors 34. Such control systems are well known, as described in U.S. Pat. No. 4,518,044.

Figure 2:
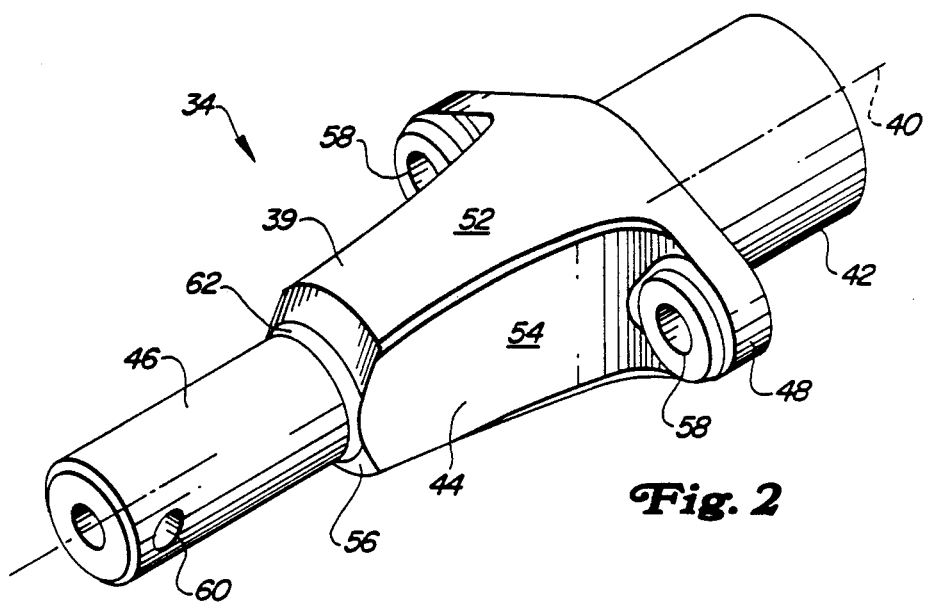
FIG. 2 shows a perspective view of the force sensor of the present invention.

The force sensor 34 of FIG. 2 extends about a central axis 40 and includes a flexible body 39 with three sections, a mounting section 42, a flexible section 44 and a force application section 46, which together form a single part formed of high tensile steel.

The mounting section or shank 42 is cylindrical, is separated from the flexible section 44 by a flange 48 and is mounted in a bore (not shown) in a housing wall, such as that of an agricultural tractor.

The flexible section 44 has a generally rectangular profile with a changing cross section and has a narrow dimension in the direction of force application and a wider dimension in a perpendicular or vertical direction. This defines upper and lower sidewalls 52 and front and back wide sidewalls 54. The sides 52 are outwardly convex in a plane perpendicular to the axis 40. They converge conically along the length of the flexible body 39, so that the sides 52 represent a segment of the surface of a cone. The sides 54 are flat and angled to each other so that the distance between them increases progressively away from the section 46 to the flange 48.

The sides 52, 54 terminate at one end in the flange 48 and in a shoulder 56 at the other end, where the outside dimensions of the flange 48 are considerably larger than those of the shoulder 56. The flange 48 is penetrated by several holes 58, through which screws, not shown, can be inserted to secure the force sensor 34 to the housing wall.

Section 46 is cylindrical in shape and is provided at its free end with a cross bore 60 which permits retention of a sleeve (not shown) by means of a pin.

Sharp edges and notches are avoided in order to strengthen the flexible body 39. This is accomplished by providing the transitions between different profiles with chamfers with generous radii. Such a chamfer is formed by the shoulder 56 and can be seen in particular between the flexible section 44 and the force application section 46. Its angle with the axis 40 is 45 degrees. The chamfer 56 joins the force application section 46 smoothly with a fillet 62.

The force is applied at the center of the section 46 and the direction of the force is usually parallel to the bore 60. In this direction the flexible body 39 will bend more easily than in a direction perpendicular thereto, due to its smaller dimensions in this direction. This causes the force sensor 34 to operate in a selective manner, whereby it reacts generally only to force components that lie in the plane defined by the bore 60 and the two holes 58. The force sensor is substantially insensitive to force components directed perpendicular to this plane.

The cross section of the section 44 increases steadily from the fillet 62 to the flange 48. It is so configured that the area adjacent to the fillet 62 provides maximum curvature. Starting at a moment arm length of approximately 50%, the curvature declines continuously, so that it is at relatively low value at the mounting point. This means that, compared to a straight pipe, the preponderance of the curvature of the flexible body 39 is generally towards the area of force application, so that the deflection of the flexible body 39 is considerably greater at the point of force application than that of a straight pipe.

Figure 3:
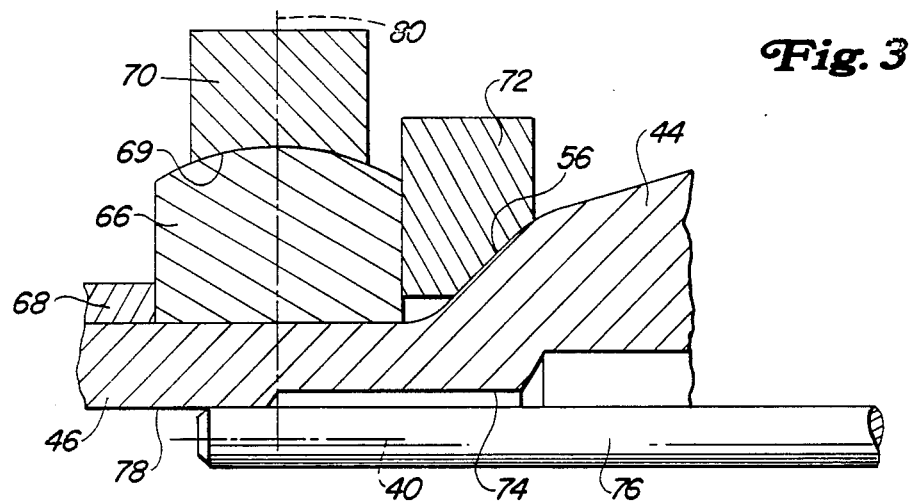
FIGS. 3 and 4 are perspective views of alternate embodiments of the present invention.

FIG. 3 shows a schematic section of the part of the flexible body 39 to which the force is applied. The cylindrical section 46 engages a bearing 66 that is free to rotate about axis 40 and which is restrained from axial motion by a sleeve 68. The bearing 66 has an outer spherical surface 69 upon which a link 70 is pivoted and provides the force application. The link 70 may be the lower draft link of an agricultural tractor hitch. Between the bearing 66 and the chamfer 56 a contact washer 72 is provided, which conforms to the contours of the bearing 66 and the chamfer 56. The contact washer 77 absorbs axial forces, which can occur when force application is not perpendicular to the axis 40.

A gauge rod 76 is retained by a press fit or by adhesive in the bore 78. At the intersection of the force application line 80 and the axis 40, the bore 78 enlarges to the bore 74. Beyond this point the gauge rod 76 is free.

Figure 4:
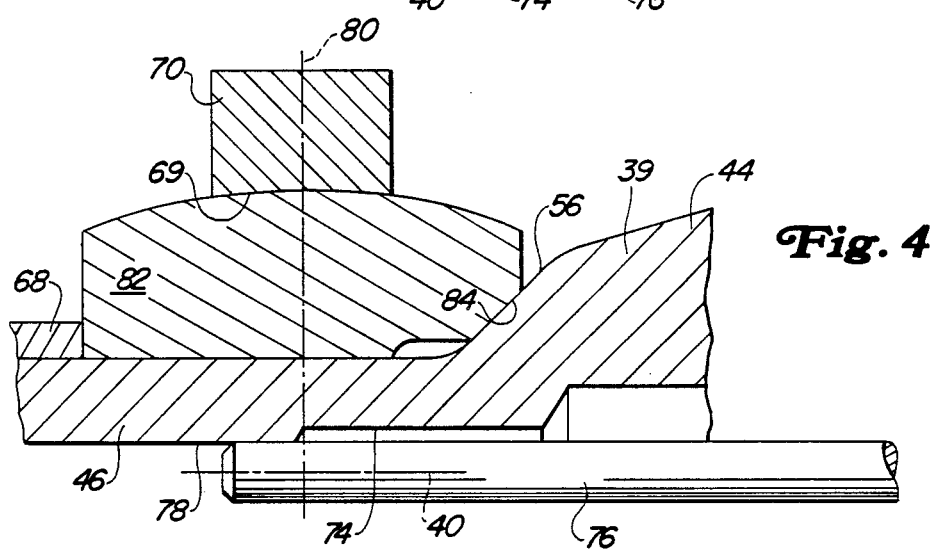

FIG. 4 represents an embodiment similar to that of FIG. 3, but wherein the bearing 66 and the contact washer 72 of FIG. 3 are combined into a common part 82. Part 82 includes a contact surface 84 which is in contact with the chamfer 56.

Figure 5:
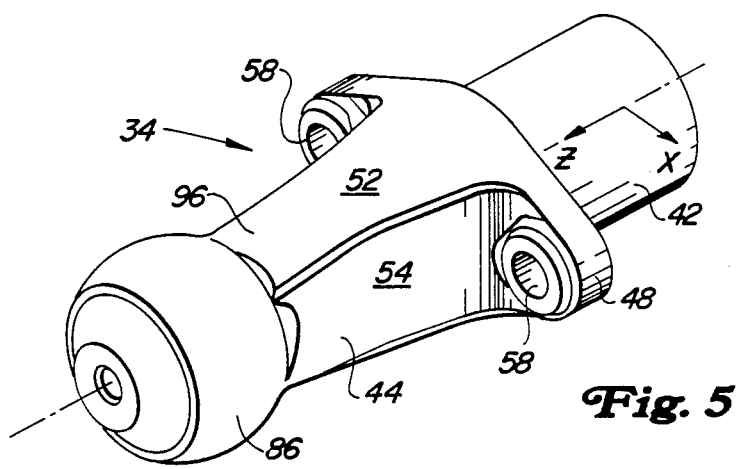
FIG. 5 is a perspective view of another embodiment of the present invention.
Figure 6:
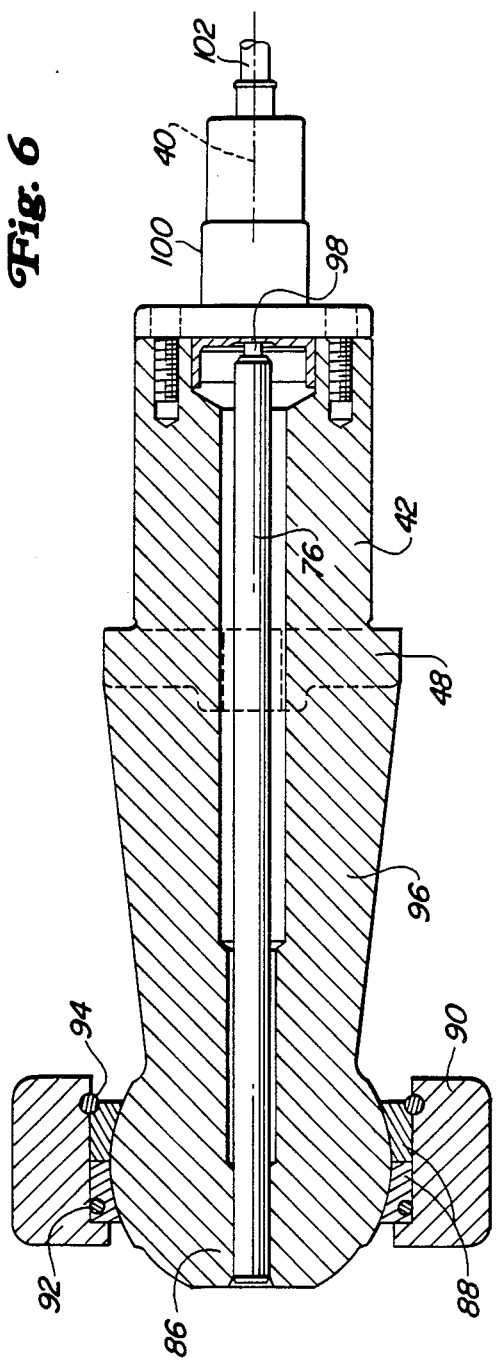
FIG. 6 is a sectional view of the force sensor of FIG. 5.

A further embodiment of the invention is shown in FIGS. 5 and 6 wherein the free end of the flexible body is in the shape of a ball 86. The center of the ball coincides with the force application line. The ball 86 engages a two-part bearing shell 88, which in turn caries a hollow end of a link 90. The two-part configuration of the bearing shell 88 simplifies the installation. The bearing halves are assembled by an internal snap ring 92 and are retained in the link 90 by a retaining ring 94.

Referring now to FIG. 6, the rod 76 is clamped in the flexible body 96 up to the line of force application. The free end of the gauge rod 76 carries a permanent magnet 98, which acts as sensor actuator. The flanged housing 100 of a Hall effect transducer is attached to the face of the shank 42 of the flexible body 96. The Hall effect transducer acts as sensor element which lies in the axis 40 of the flexible body 96 and reacts to a deflection of the magnet on the end of the gauge rod 76. The deflection of the gauge rod shown in FIG. 6 occurs perpendicular to the plane of the drawing. The Hall effect transducer is connected by measurement lines 102 with a control or regulating arrangement (not shown).

The magnet is oriented in such a way that its direction of polarization lies in the horizontal plane of force application and lowest bending stiffness. Its poles lie on an axis which is perpendicular to the gauge rod axis 40. According to FIG. 6 one pole lies above and one pole below the plane of the paper. The Hall effect transducer is oriented in such a way that it reacts to components of the magnetic field that are directed along the gauge rod axis 40.

Figure 7:
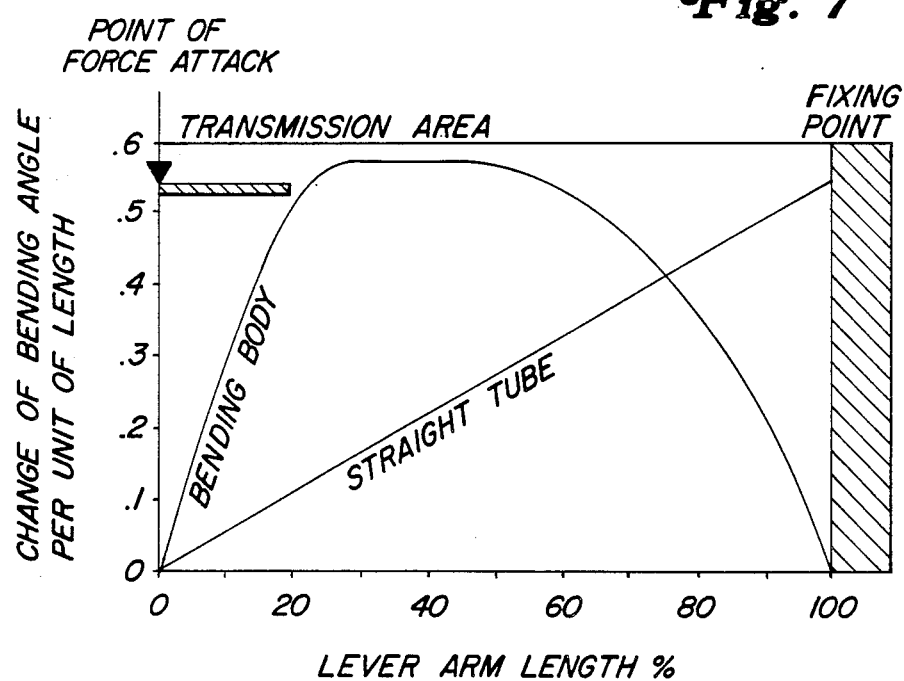
FIG. 7 shows the diagram of the curvature of a flexible body along its axis.

FIG. 7 shows the change in the deflection of the flexible body 39 of FIG. 2 over the axial length of the body. FIG. 7 also shows the deflection of a straight pipe. The deflection of the straight pipe increases at a linear rate with the distance from the fixed end. A linear relationship can be seen in a first region of the curve for the flexible body up to approximately 20% of the length of the moment arm. This region represents section 46 of the body 39. The slope is considerably greater than that of the straight pipe, since section 46 has a relatively smaller diameter. At a moment arm length of approximately 20% to 25% the deflection curve flattens out and reaches a plateau that lies between 25% and 50% of the moment arm length. The area between the rising curve and the plateau corresponds approximately to the fillet 62 and the chamfer 56 of the body 39.

Figure 8:
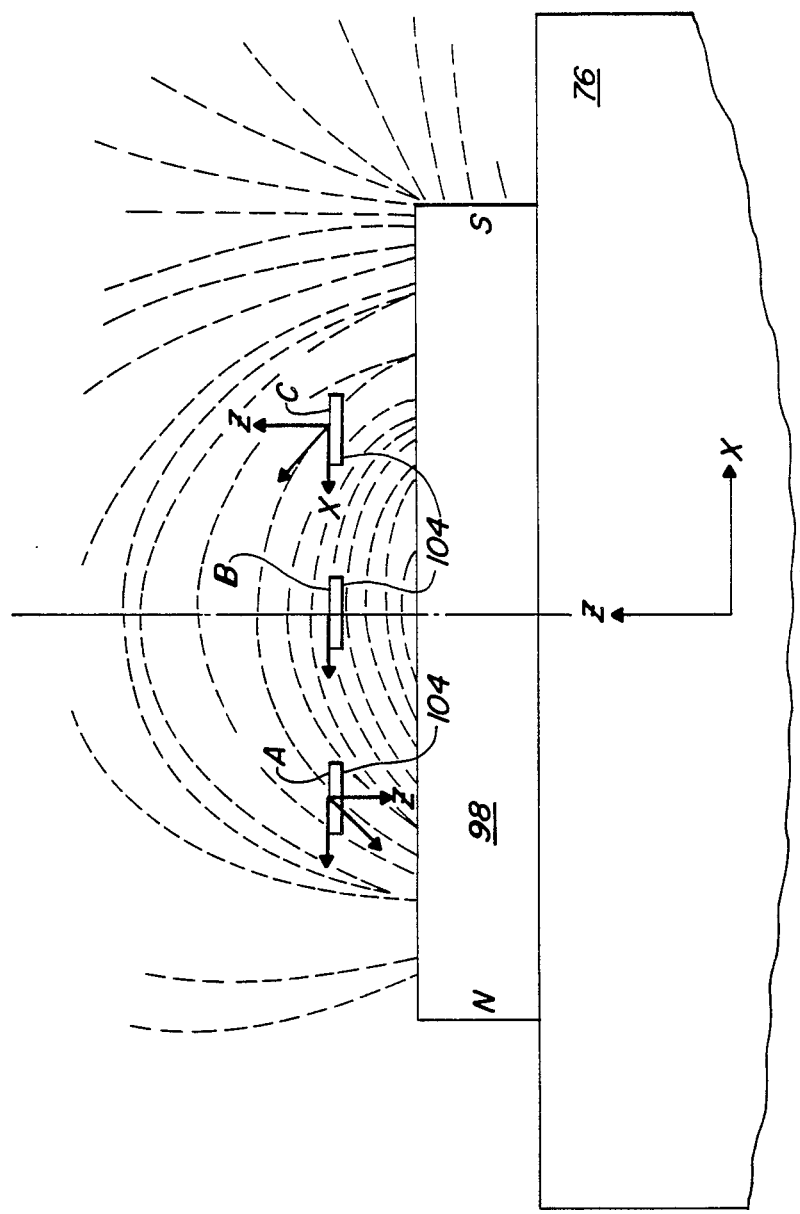

FIG. 8 shows the permanent magnet 98 attached to the end of the gauge rod 76 with a north pole N and a south pole S. The pattern of magnetic lines of the magnetic field is indicated by dashed lines. The magnetic lines issue from the south pole S and run as curved lines to the north pole N. In the central region between the poles the magnetic lines are approximately parallel to the length of the magnet 98. The coordinate z is parallel to the gauge rod axis 40 and coordinate x is parallel to the direction of minimum bending stiffness of the force sensor 96. Three of the possible positions which may be occupied by the Hall effect transducer 104 are shown in FIG. 8 and are labeled as positions A, B, and C. The Hall effect transducer 104 reacts to components of the magnetic field that lie in the direction z. If no force is applied to the force sensor, the Hall effect transducer 104 will be in the central position B relative to the magnet 98. In this position B little or no magnetic field components in the direction z can be detected, since here the magnetic lines are substantially parallel to the surface of the magnet, (in the x direction). Accordingly, the Hall effect transducer does not provide any voltage output signal.

When an applied force moves the Hall effect transducer 104 away from the central position B to a position such as A or C, the transducer 104 will be exposed to magnetic field components in the z direction. The polarity of this component will depend on whether the Hall effect transducer is closer to the north pole N or the south pole S. The Hall effect voltage is correspondingly positive or negative. Hence, the polarity of the Hall effect voltage will indicate in which direction the force sensor 96 occurs is deflected.

In the vicinity of the central position B, an approximately proportional relationship exists between the z component of the magnetic field strength and the x distance of the Hall effect transducer from the central position B. This simplifies the calibration of the force sensor considerably.

It is also possible to deliberately reduce the linear region by reducing the length of the magnet. In the area of the poles a sharply progressive increase in the magnetic field density with the distance x can be noted, with a resulting progressive increase in the Hall effect voltage. It would be possible to increase the sensitivity of the force sensor once the applied force has reached a certain predetermined level, in order to achieve a more rapid or definitive response of the hydraulic control of the lift arm.

Figure 9:
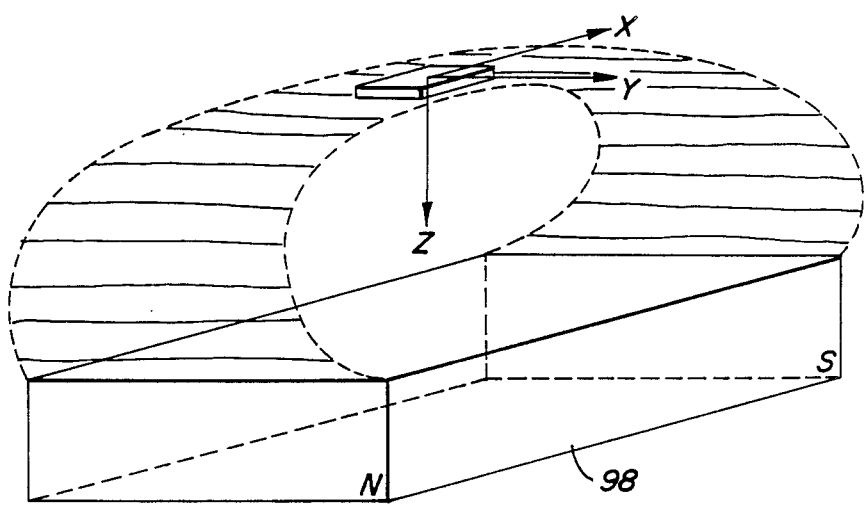
FIGS. 8 and 9 illustrates the relationship of the permanent magnet to the Hall effect transducer.

FIG. 9 shows a perspective view of a permanent magnet 98 corresponding to FIG. 8. Here, too, the z axis lies in the direction of the gauge rod axis 40, and the x axis in the direction of the minimum bending stiffness of the force sensor 96. The y axis is perpendicular to the x and z axis. The permanent magnet 98 is rectangular and slab-shaped and polarized in the x direction.

FIG. 9 shows the magnetic field lines which cover approximately the width of the magnet. This illustration shows that during a shift in the y direction no significant change in field strength occurs. Accordingly, the z magnetic field components detected by the Hall effect transducer of the magnetic field strength do not change upon a shift in the y direction. Hence, the directional selectivity of the force sensor can be further increased by widening the permanent magnet 98 in the y direction.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. In a force sensor having a hollow bendable body having a fixed end and a free end to which a force may be applied in a direction perpendicular to a longitudinal axis of the body by a link connected thereto, a gage rod received by the body and having a first end fixed to the free end of the body and a second free end, and a displacement transducer for generating an output signal representing displacement of the rod free end with respect to the body fixed end, characterized by:
   the cross sectional area of the body increases from its free end to the fixed end, and the body has a central portion which has a cross section which is thicker in a direction perpendicular to a line through which forces are transmitted to the body free end and which is thinner in a direction parallel to said line.

2. The force sensor of claim 1, wherein: the body has a smoothly curved outer peripheral surface.

3. The force sensor of claim 1, further comprising:
   a contact washer mounted on the body between the body free end and the central portion, the contact washer having a surface which engages and conforms to contours of the central portion.

4. The force sensor of claim 1, wherein:
   the link has a contact surface which slidably engages and conforms to contours of the central portion of the body.

5. In a force sensor having a hollow bendable body having a fixed end and a free end to which a force may be applied in a direction perpendicular to a longitudinal axis of the body by a link connected thereto, a gage rod received by the body and having a first end fixed to the free end of the body and a second free end, and a displacement transducer for generating an output signal representing displacement of the rod free end with respect to the body fixed end, characterized by:
   the cross sectional area of the body increases from its free end to the fixed end, the body comprising a mounting flange which extends perpendicular to the longitudinal axis of the body, and a shank which extends axially from the flange and away from the body free end.

6. In a force sensor having a hollow bendable body having a fixed end and a free end to which a force may be applied in a direction perpendicular to a longitudinal axis of the body by a link connected thereto, a gage rod received by the body and having a first end fixed to the free end of the body and a second free end, and a displacement transducer for generating an output signal representing displacement of the rod free end with respect to the body fixed end, characterized by:
   the cross sectional area of the body increases from its free end to the fixed end, the body forming a ball member on the free end thereof, and the link is pivotally coupled to the ball member by bearings which are comprised of first and second ring members mounted for rotation on the ball member and received by the link, and a retaining ring retains the ring member within the link.

7. In a force sensor having a hollow bendable body having a fixed end and a free end to which a force may be applied in a direction perpendicular to a longitudinal axis of the body by a link connected thereto, a gage rod received by the body and having a first end fixed to the free end of the body and a second free end, and a displacement transducer for generating an output signal representing displacement of the rod free end with respect to the body fixed end, characterized by:
   the cross sectional area of the body increases from its free end to the fixed end; and
   the transducer comprising a permanent magnet with poles oriented perpendicular to an axis of the gauge rod, and a Hall-effect sensor oriented so as to respond to changes in magnetic field components directed perpendicular to the gage rod axis.

8. The force sensor of claim 7, wherein:
   the magnet is oriented so that there is little variation in magnetic field strength in a direction perpendicular to the gauge rod axis and perpendicular to a line through which force is applied via the link.

9. The force sensor of claim 7, wherein:
   the body has a larger stiffness in a direction perpendicular to a line connecting poles of the permanent magnet and a smaller stiffness in a direction parallel to said line connecting the poles.

* * * * *